United States Patent
Richter

(10) Patent No.: US 10,583,521 B2
(45) Date of Patent: Mar. 10, 2020

(54) METHOD FOR PRODUCING A BLADE FOR A TURBOMACHINE

(71) Applicant: MTU Aero Engines AG, Munich (DE)

(72) Inventor: Karl-Hermann Richter, Markt Indersdorf (DE)

(73) Assignee: MTU AERO ENGINES AG, Munich (DE)

( * ) Notice: Subject to any disclaimer, the term of this patent is extended or adjusted under 35 U.S.C. 154(b) by 76 days.

(21) Appl. No.: 15/833,140

(22) Filed: Dec. 6, 2017

(65) Prior Publication Data
US 2018/0154479 A1 Jun. 7, 2018

(30) Foreign Application Priority Data

Dec. 7, 2016 (DE) .................. 10 2016 224 386

(51) Int. Cl.
*B23K 20/12* (2006.01)
*B23P 15/04* (2006.01)
(Continued)

(52) U.S. Cl.
CPC ............ *B23K 20/129* (2013.01); *B23K 20/12* (2013.01); *B23K 20/22* (2013.01); *B23P 15/04* (2013.01); *C22C 14/00* (2013.01); *C22F 1/183* (2013.01); *F01D 5/147* (2013.01); *F01D 5/28* (2013.01); *B23K 2101/001* (2018.08);
(Continued)

(58) Field of Classification Search
CPC ....... B23K 20/12–1215; B23K 20/1285–1295; B23K 2103/14; B23K 2101/001; B23P 15/04; F01D 5/147; F01D 5/28; C22C 14/00; C22C 2202/00; C22F 1/183; Y02T 50/672; F05D 2300/174; F05D 2230/239; F05C 2251/04; F05C 2201/90; F05B 2230/239; F05B 2230/40; F05B 2280/1074
USPC ............................ 228/112.1–114.5, 2.1–2.3; 29/889–889.722
See application file for complete search history.

(56) References Cited

U.S. PATENT DOCUMENTS 3,549,273 A * 12/1970 Bird .................. F01D 5/28
416/241 R
4,900,398 A * 2/1990 Chen ................ C23F 1/26
216/109
(Continued)

FOREIGN PATENT DOCUMENTS

CA 2779728 A1 * 12/2012 ............ B23K 20/12
DE 4409769 A1 9/1995
(Continued)

*Primary Examiner* — Kiley S Stoner
(74) *Attorney, Agent, or Firm* — Abel Schilinger, LLP

(57) ABSTRACT

Disclosed is a method for producing a blade comprising a blade airfoil and a blade root for a turbomachine. The method comprises providing a first workpiece based on a first material and a second workpiece based on a second material which is different from the first material and has a higher temperature resistance than the first material; and connecting the first workpiece and the second workpiece by friction welding to form a composite component having a first region of the first material, and a second region of the second material. Optionally upon material-subtracting further processing, the first region forms the blade root, and the second region forms the blade airfoil.

20 Claims, 1 Drawing Sheet

(51) Int. Cl.
*B23K 20/22* (2006.01)
*C22C 14/00* (2006.01)
*C22F 1/18* (2006.01)
*F01D 5/14* (2006.01)
*F01D 5/28* (2006.01)
*B23K 101/00* (2006.01)
*B23K 103/14* (2006.01)

(52) U.S. Cl.
CPC ...... *B23K 2103/14* (2018.08); *C22C 2202/00* (2013.01); *F05B 2230/239* (2013.01); *F05B 2230/40* (2013.01); *F05B 2280/1074* (2013.01); *F05C 2201/90* (2013.01); *F05C 2251/04* (2013.01); *F05D 2230/239* (2013.01); *F05D 2300/174* (2013.01); *Y02T 50/672* (2013.01)

(56) References Cited

U.S. PATENT DOCUMENTS

| | | | | |
|---|---|---|---|---|
| 5,492,581 | A * | 2/1996 | Searle | B23K 20/1205 156/73.5 |
| 5,705,082 | A * | 1/1998 | Hinson | C23F 1/02 216/100 |
| 6,095,402 | A * | 8/2000 | Brownell | B23K 20/1205 228/112.1 |
| 6,199,744 | B1 * | 3/2001 | Schneefeld | B23K 20/129 228/112.1 |
| 6,616,408 | B1 * | 9/2003 | Meier | B23K 13/01 416/193 A |
| 7,634,854 | B2 | 12/2009 | Meier | |
| 2002/0127108 | A1 * | 9/2002 | Crall | B23K 20/129 416/213 R |
| 2004/0018091 | A1 * | 1/2004 | Rongong | F01D 5/147 416/229 A |
| 2005/0244273 | A1 * | 11/2005 | Parisi | B23P 15/04 416/241 R |
| 2006/0231593 | A1 * | 10/2006 | Bayer | B23K 20/1205 228/112.1 |
| 2009/0249622 | A1 | 10/2009 | Schreiber | |
| 2009/0265933 | A1 | 10/2009 | Schreiber | |
| 2009/0269193 | A1 * | 10/2009 | Larose | B23K 20/1205 415/200 |
| 2009/0314823 | A1 * | 12/2009 | Bray | B23K 20/1205 228/112.1 |
| 2012/0121437 | A1 * | 5/2012 | Borufka | F01D 5/22 416/97 R |
| 2012/0224972 | A1 * | 9/2012 | Stiehler | B23K 13/00 416/223 A |
| 2012/0280485 | A1 * | 11/2012 | Stol | B23K 20/233 285/21.1 |
| 2012/0318774 | A1 * | 12/2012 | Wlasowski | B23K 20/12 219/117.1 |
| 2014/0044532 | A1 * | 2/2014 | Richter | B23P 15/006 415/200 |
| 2014/0202601 | A1 * | 7/2014 | Helm | C22C 14/00 148/670 |
| 2014/0356159 | A1 * | 12/2014 | Heikurinen | F04D 29/023 415/210.1 |
| 2015/0218675 | A1 * | 8/2015 | Schloffer | C22C 14/00 420/418 |
| 2015/0300182 | A1 * | 10/2015 | Mottin | B23P 6/005 416/213 R |
| 2015/0308984 | A1 * | 10/2015 | Coulette | G01N 29/265 73/588 |
| 2016/0010184 | A1 * | 1/2016 | Smarsly | B22F 3/15 419/66 |
| 2016/0146024 | A1 * | 5/2016 | Morris | F01D 5/3061 416/96 R |
| 2016/0175983 | A1 * | 6/2016 | Chivers | B22F 5/04 29/889.23 |
| 2016/0273368 | A1 * | 9/2016 | Smarsly | B22F 3/04 |
| 2017/0014938 | A1 * | 1/2017 | Berry | B23K 20/1205 |
| 2017/0022594 | A1 * | 1/2017 | Martin | B22D 13/04 |
| 2017/0022827 | A1 * | 1/2017 | Waldman | F01D 5/3061 |
| 2017/0145837 | A1 * | 5/2017 | Schloffer | B23K 20/1205 |
| 2017/0314401 | A1 * | 11/2017 | Schloffer | B23K 26/21 |
| 2017/0328225 | A1 * | 11/2017 | Mottin | B23K 20/1205 |

FOREIGN PATENT DOCUMENTS

| | | | | |
|---|---|---|---|---|
| DE | 19858702 | B4 | 7/2004 | |
| DE | 102004032975 | A1 | 2/2006 | |
| DE | 102005010814 | B3 * | 7/2006 | ........ B23K 20/1205 |
| DE | 102011086770 | A1 | 5/2013 | |
| DE | 102010006907 | B4 | 10/2013 | |
| EP | 2106873 | A1 | 10/2009 | |
| EP | 2111943 | A1 | 10/2009 | |
| WO | WO-9828103 | A1 * | 7/1998 | ........ B23K 20/129 |

* cited by examiner

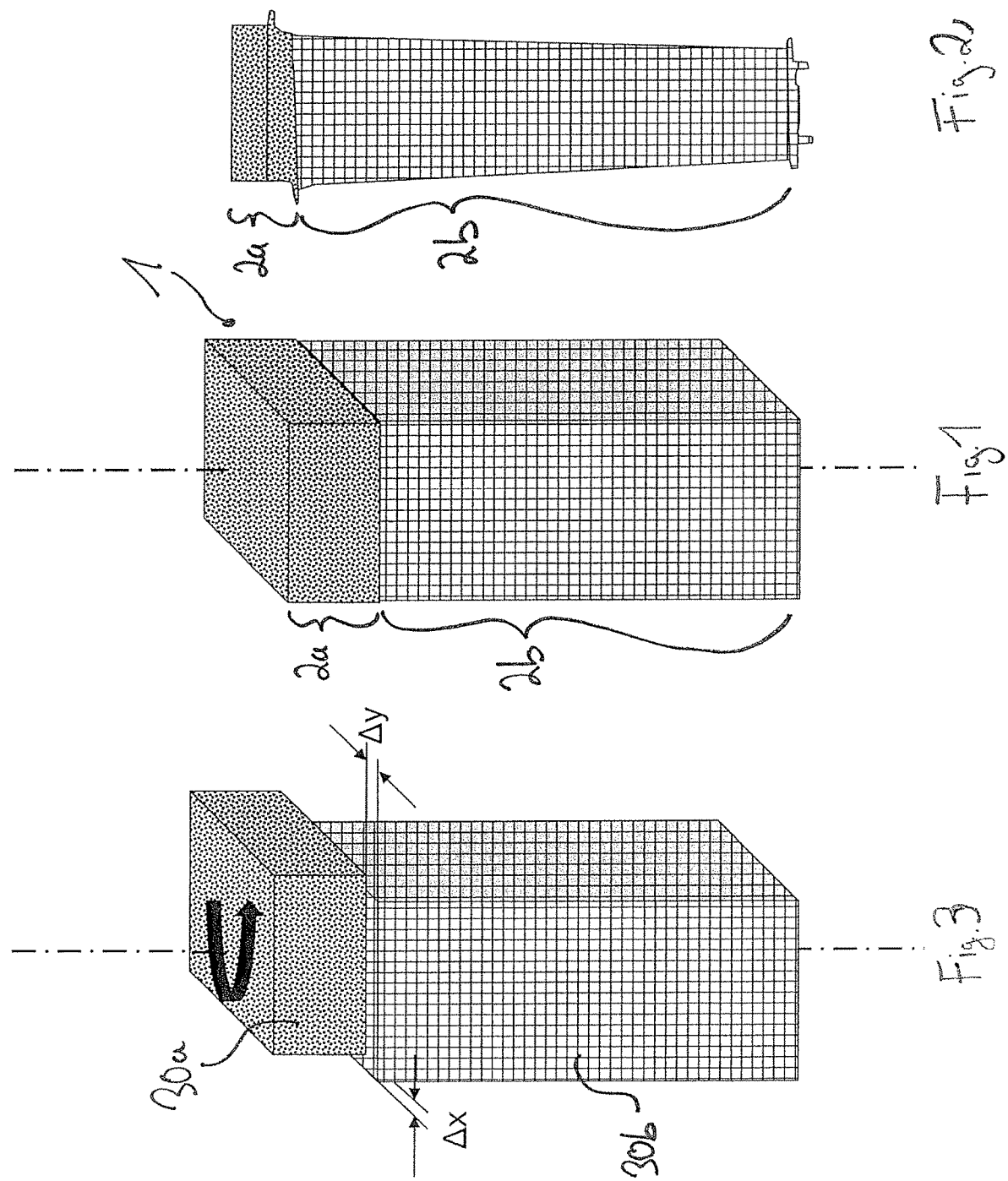

METHOD FOR PRODUCING A BLADE FOR A TURBOMACHINE

CROSS-REFERENCE TO RELATED APPLICATIONS

The present application claims priority under 35 U.S.C. § 119 of German Patent Application No. 102016224386.1, filed Dec. 7, 2016, the entire disclosure of which is expressly incorporated by reference herein.

BACKGROUND OF THE INVENTION

1. Field of the Invention

The present invention relates to a method for producing a blade comprising a blade airfoil and a blade root for a turbomachine.

2. Discussion of Background Information

The blade can generally also be a guide vane, a use as a rotor blade being preferred. Such a rotor blade conjointly with further rotor blades can be assembled to form a blade-equipped rotor, for example in that each of the rotor blades by way of the blade root thereof is inserted into a respective receptacle of a rotor ring. The blade root of a respective blade serves for mechanically fastening the latter, the blade airfoil being that region of the blade that is exposed to the flow in the gas duct.

SUMMARY OF THE INVENTION

The present invention is based on the technical object of providing a particularly advantageous method for producing a blade having a blade airfoil and a blade root.

Accordingly, the present invention provides a method for producing a blade for a turbomachine, which blade comprises a blade airfoil and a blade root. The method comprises:
- providing a first workpiece based on a first material and a second workpiece based on a second material which is different from the first material and has a higher temperature resistance than the first material;
- connecting the first workpiece and the second workpiece by friction welding to form a composite component having a first region of the first material, and a second region of the second material.
- Optionally upon material-subtracting further processing, the first region forms the blade root, and the second region forms the blade airfoil.

In one aspect of the method, the first material may be a first titanium aluminide alloy (TiAl) and/or the second material with higher temperature resistance may be a second titanium aluminide alloy (HT-TiAl) which has a lower elongation at break than the first titanium aluminide alloy (TiAl).

In another aspect, the friction welding may comprise orbital friction welding. For example, the mutual relative movement of the first workpiece and of the second workpiece in the orbital friction welding may describe an elliptic shape.

In yet another aspect of the method, the mutual relative movement of the first workpiece and of the second workpiece in the friction welding may have a maximum amplitude of at least about 0.1 mm and at most about 5 mm and/or may be periodic and have a frequency f of at least about 25 Hz and at most about 125 Hz.

In a still further aspect of the method, the first workpiece and the second workpiece in the friction welding, while the first workpiece and the second workpiece are moved relative to one another, may be pressed against one another at a surface pressure of at least about 50 MPa and at most about 250 MPa.

In another aspect of the method, post-compressing for a period of at least about 10 s and at most about 300 s may take place subsequently to the friction welding. For example, post-compressing may take place subsequently to the friction welding at a surface pressure that is at least as high as (or at least about 10% higher than) the surface pressure during the friction welding.

In another aspect of the method, the joint area between the first workpiece and the second workpiece may be preheated to a temperature above the brittle-ductile transition of at least one of the two materials.

In another aspect, the first workpiece and the second workpiece in the friction welding may be kept in a protective atmosphere at least in the region about a joint area between the first workpiece and the second workpiece.

In another aspect of the instant method, the composite component after the friction welding may be heat-treated at a temperature of at least about 800° C.

In another aspect, after the friction welding the blade root in a material-subtracting further processing may be machined from the first region and/or the blade airfoil may he machined from the second region.

The present invention further comprises a blade which is obtained by using the method set forth above (including the various aspects thereof).

As set forth above, a composite component having a first region and a second region of different materials is produced in that a first workpiece based on the first material is connected by friction welding to a second workpiece based on the second material. The two materials differ in that the second material has a higher temperature resistance than the first material. The second region of the material having the higher temperature resistance then forms the blade airfoil, and the other, first region forms the blade root (in each case optionally upon material-subtracting further processing of the composite component). Summarizing in a simplified manner, the blade as a composite component is produced by friction welding, different materials thus being assigned to the blade root and to the blade airfoil.

This can be advantageous, for example, to the extent that the respective material can thus be optimized in terms of the respective dominant requirement. It has thus been established, for example, that a conflict of interest between a design for a high temperature load, on the one hand, and the structural-mechanical requirements, on the other hand, can exist when optimizing materials, in particular alloys (see below for details). Specifically, a material that is designed for the high temperatures in the gas duct and thus designed to be the blade airfoil can be so brittle that said material no longer meets the requirement profile in the blade root in terms of structural mechanics. In the latter, for example in the case of the rotor, a significant load can arise by virtue of the centrifugal forces. However, since the temperatures in the region of the blade root are already significantly lower than in the region of the blade airfoil, the blade root presently is provided so as to be of another material. The latter can be better optimized or chosen, respectively, with a view to the structural-mechanical requirements.

The blade is preferably a turbine blade which is thus disposed downstream of the combustion chamber. A blade for a jet engine is preferred. While, in general terms, a guide vane that is constructed as a composite component can also be of interest, a rotor blade is preferred. Specifically, the mechanical load in the blade root can be particularly high by virtue of the centrifugal forces such that, conversely, the advantages set forth are particularly salient. In terms of a functional delimitation of a blade airfoil and a blade root, reference is made explicitly to the statement pertaining to the prior art; in the case of the rotor blade the blade root is preferably contained with a minor clearance in a respective receptacle in the rotor ring, a toothing between the blade root and the rotor ring usually being constructed from a plurality of teeth and complementary grooves (also referred to as a pine-tree shape or a dovetail shape).

Material-subtracting further processing is possible after the production of the composite component (see below for details). The terms "first region" and "second region", respectively, thus refer to a respective part of the composite component, in each case directly after the production of the latter as well as after a potential shape-imparting subtraction of material. For example, the second region which in this instance forms the blade airfoil can still be cuboid in shape immediately after the production of the composite component, and the shape of the blade airfoil can then be machined in a material-subtractive manner (both the cuboid as well as the turbine blade airfoil being referred to as the "first region"). Regardless of the details, further processing after the production of the composite component is preferably performed in a non-forming manner (i.e. without a forming component), there in particular thus not being any downstream forging procedure.

Preferred embodiments are to be found in the present specification and in the dependent claims, wherein a differentiation between the aspects of the method, the aspects of the device, and the aspects of the application, respectively, is not always made in the illustration of the features; in any case, the disclosure is to be understood to implicitly apply to all categories of claims.

In one preferred embodiment the first material is a first titanium aluminide alloy ("TiAl"). This can be a so-called γ-TiAl, also known as TiAl TNM. In general, the first TiAl alloy, in addition to the titanium and the aluminum as component parts of the alloy, can also comprise one or further component parts, in particular at least one element from the group W, Mo, Nb, So, Hf, Y, Zr, Er, Gd, Si, and C; preferably said first TiAl alloy, in addition to Ti and Al, also comprises Nb, Mo, and B as components of the alloy, furthermore preferably comprises exclusively these components of the alloy.

In a preferred embodiment the high temperature-resistant second material is a titanium aluminide alloy (in the following also referred to as "HT-TiAl" in order to identify the high temperature resistance) which furthermore preferably has a lower elongation at break than the first titanium aluminide alloy (in the following also referred to as only "TiAl"). The lower elongation at break is a manifestation of the higher brittleness or, conversely, of the lower ductility; the elongation at break of the HT-TiAl can, for example, be at least about 20%, at least about 30%, at least about 40% or at least about 50%, respectively, lower than that of the TiAl (of the first titanium aluminide alloy), wherein potential upper limits are, for example, at most about 200%, at most about 150%, or at most about 100%, respectively. Independently thereof, the TiAl and the HT-TiAl can also differ from one another in that the transition in the brittle-ductile phase in the case of the latter is at a higher temperature. Phases which displace the creep resistance toward higher application temperatures can be incorporated, for example, in a targeted manner in the case of the HT-TiAl (the same creep behavior in this instance arises only at a respective higher temperature), for example by at least about 50° C., preferably at least about 100° C., in comparison with the TiAl, wherein potential upper limits independently thereof can be at most, for example, about 200° C. or about 150° C., respectively. The TiAl and the HT-TiAl can differ in terms of the concentration and/or the composition of their respective alloy components.

In one preferred embodiment the friction welding is orbital friction welding which in relation to rotary friction welding, for example, can he advantageous to the extent that all points on the surface move at the same velocity. Multi-orbital friction welding in which both workpieces are moved relative to a stationary reference system can be particularly preferred. The workpieces herein can be moved in the same direction but by way of a phase shift by which the relative velocity can be increased. A phase shift of 180° is preferred, the relative velocity being able to be doubled.

In a preferred embodiment of the orbital friction welding (also independently of the multi-orbital friction welding), a mutual relative movement of the workpieces is performed in a generally elliptic shape. In as far as a relative movement of the workpieces is being viewed in general, said relative movement can take place as a relative movement between two points, one of which being in the interface of the first workpiece and the other being in the interface of the second workpiece, wherein the two points upon joining are congruent. In the case of the ellipse, the semimajor axis thereof can correspond to about 1.1, 1.2, 1.3, 1.4, or 1.5 times the semiminor axis, wherein potential upper limits (independently thereof) are, for example, at most about 4, at most about 3, or at most about 2.5 times said semiminor axis. In a borderline case, when the semiminor axis approximates zero, the orbital friction welding transitions toward linear friction welding. In another borderline case, when the semiminor and the semimajor axes are of identical size, a circular movement results.

In one preferred embodiment which relates both to orbital, in particular multi-orbital, friction welding as well as to linear friction welding, the relative movement of the two workpieces has a maximum amplitude of (in order of increasing preference) at least about 0.1 mm, at least about 0.2 mm, at least about 0.3 mm, at least about 0.4 mm, at least about 0.5 mm, at least about 0.6 mm, at least about 0.7 mm, at least about 0.8 mm, at least about 0.9 mm, and at least about 1 mm, respectively. Preferred upper limits (in order of increasing preference) can be at most about 5 mm, at most about 4 mm, at most about 3 mm, or at most about 2.5 mm, respectively, wherein the provision of an upper limit can generally also be of interest and is to be disclosed independently of a lower limit, and vice versa. The maximum amplitude results, for example, in the case of the ellipse along the semimajor axis of the latter and in a linear movement along said semimajor axis, and in the case of the circular shape in an omnidirectional manner.

In one preferred embodiment the workpieces are moved in relation to one another in a periodic manner, preferably in an orbital or, in particular, a multi-orbital manner, or else in a linear manner. A frequency f herein can be, for example, at least about 25 Hz, preferably at least about 50 Hz, particularly preferably at least about 75 Hz; potential upper limits can be, for example, at most about 125 Hz, preferably at most about 100 Hz, wherein the upper and the lower limit can also be of interest and are to be disclosed independently of one another.

In a preferred embodiment the two workpieces while being moved relative to one another, are pressed against one another at a surface pressure of at least about 50 MPa, further preferably at least about 75 MPa or at least about 80 MPa, respectively. Advantageous upper limits of the surface pressure in order of increasing preference can be at most about 250 MPa, at most about 200 MPa, at most about 150 MPa, at most about 130 MPa or at most about 125 MPa, respectively, wherein the upper and the lower limit can again be generally of interest independently of one another. A surface pressure of approximately 100 MPa is particularly preferred. The surface pressure results from the force that is applied to the contact face.

In the case of one preferred embodiment, post-compressing takes place subsequently to the friction welding, for example for at least about 10 s, further and particularly preferably at least about 20 s or at least about 30 s, respectively. Upper limits which generally are independent thereof can be, for example, at most about 300 s, at most about 240 s or at most about 180 s, respectively. "Post-compression" means that a certain surface pressure is still temporarily applied even when the workpieces are no longer moved in relation to one another.

In a preferred embodiment post-compressing takes place subsequently to the friction welding, specifically at a surface pressure that is at least as high as the surface pressure during the friction welding, preferably is at least about 10% higher, particularly preferably at least about 20% higher, than the latter. Potential upper limits (independently thereof) can be, for example, at most about 50%, at most about 40%, or at most about 30%, respectively.

In a preferred embodiment the friction welding process can be carried out with preheating. The preheating can he performed by means of a heating radiator, for example, inductive preheating being preferable (the output being coupled into the component in an inductive manner by way of an induction loop).

In a preferred embodiment the friction welding is performed in a protective gas atmosphere. Inert gases such as, for example, generally also argon, but in particular helium, can be preferable as a protective gas. Helium as an inert gas is preferable since helium has a smaller atomic radius than argon and therefore can diffuse from the molten product via interstices.

In a preferred embodiment the composite component after the friction welding is heat-treated at a temperature of at least about 800° C. The heat treatment is preferably performed at ambient pressure (independently of whether hot isostatic pressing has previously been carried out or not). Potential upper limits of the temperature in the heat treatment can be at most, for example, about 1200° C., about 1100° C., or about 1000° C., respectively. The heat treatment can preferably be performed for at least about 1 h, further and particularly preferably at least about 2 h, or at least about 3 h, respectively, wherein potential upper limits (independently thereof) can be, for example, at most about 48 h, at most about 36 h, or at most about 24 h, respectively. A heat treatment is preferably carried out prior to any potential material-subtracting further processing.

In a preferred embodiment, the blade root, after the friction welding, in a material-subtracting further processing is machined from the first region, and/or the blade airfoil is machined from the second region. The first and/or the second region herein can also be already pre-shaped, thus does not mandatorily have to have the shape of a cuboid. The material-subtracting further processing can for example be a chip-removing one, for example milling, and/or can be performed electrochemically, for example as electrochemical ablation.

The invention also relates to a blade having a blade airfoil and a blade root for a turbomachine, in particular a jet engine, said blade having been produced by a method as set forth above.

BRIEF DESCRIPTION OF THE DRAWINGS

In the appended drawings,

FIG. 1 shows a composite component in an intermediate step of the production method according to the invention;

FIG. 2 shows the blade that has subsequently been machined in a material-subtracting manner from the composite component according to FIG. 1;

FIG. 3 shows the production of the composite component according to FIG. 1 by means of friction welding.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

FIG. 1 shows a composite component 1 which is made up of a first region 2a and of a second region 2b. The first region is provided by a first titanium aluminide alloy, a so-called γ-TiAl. The second region 2b is also provided by a titanium aluminide alloy which in terms of the creep behavior thereof is however designed for higher temperatures, the brittle-ductile transition of said second region 2b being at a higher temperature than that of the first alloy. Conversely, the ductility of the second alloy is lower, thus having a lower elongation at break than the first alloy (cf. also the details of the explanations in the introduction to the specification).

The second alloy is thus indeed suitable for the use in high-temperature conditions such as arise in the gas duct of a turbine, in particular of a jet engine (on the blade airfoil). However, by virtue of the brittleness the second alloy does not meet the structural-mechanical requirements which by virtue of the centrifugal forces apply in the region of the blade root of a rotor vane. A material failure could arise at that point by virtue of the reduced elongation at break.

According to the invention, the composite component 1 is thus produced, the first region 2a of the latter in this instance forming the blade root, and the second region 2b of said composite component 1 forming the blade airfoil. The first titanium aluminide alloy is more ductile and thus also better tuned to the requirement profiles in the blade root where in turn the temperatures are lower than in the region of the blade airfoil.

The blade according to FIG. 2 is produced by a material-subtracting further processing, for example electrochemically or by milling, from the composite component according to FIG. 1, the production of the latter being explained in detail hereunder. The first region 2a in this instance forms the blade root, the second region 2b forming the blade airfoil.

FIG. 3 shows how the first workpiece 30a and the second workpiece 30b are friction-welded together in order for the composite component 1 to be produced. The relative movement of the orbital friction welding describes a circular path; the amplitudes Δx and Δy are thus of equal size, being about 1 to 2 mm. In general however, the workpieces 30a,b can of course also be moved relative to one another on an elliptic path, or joined by means of linear friction welding, respectively, reference being made explicitly to the introduction to the specification.

The amplitude of the relative movement is about 60 to 80 Hz, and the two workpieces 30a,b meanwhile are pressed against one another at a surface pressure of about 100 MPa. The workpieces 30a,b are subsequently post-compressed for approximately 30 seconds, specifically at a surface pressure of about 120 MPa. The workpieces 30a,b prior to or during the friction welding, respectively, are preferably preheated to a temperature above the brittle-ductile phase transition temperatures of both materials, said preheating preferably being by inductive heating. The composite component 1 after a heat treatment at about 1000° C. for several hours is fed to the material-subtracting further processing as has been described above.

LIST OF REFERENCE NUMERALS

First workpiece 30a
Second workpiece 30b
Composite component 1
First region 2a
Second region 2b

What is claimed is:

1. A method for producing a blade comprising a blade airfoil and a blade root for a turbomachine, wherein the method comprises:
    providing a first workpiece based on a first material which is a first titanium aluminide alloy (TiAl);
    providing a second workpiece based on a second material which has a higher temperature resistance than the first material and is a second titanium aluminide alloy (HT-TiAl) which has a lower elongation at break than the first titanium aluminide alloy (TiAl);
    directly connecting the first workpiece and the second workpiece by friction welding to form a composite component having a first region of the first material, and a second region of the second material;
    the first region forming the blade root, and the second region forming the blade airfoil.

2. The method of claim 1, wherein the first titanium aluminide is γ-TiAl.

3. The method of claim 1, wherein the first titanium aluminide further comprises at least one element selected from W, Mo, Nb, Co, Hf, Y, Zr, Er, Gd, Si, B and C.

4. The method of claim 1, wherein the first titanium aluminide further comprises at least Nb, Mo, and B as further components.

5. The method of claim 1, wherein the first titanium aluminide comprises exclusively Nb, Mo, and B as further components.

6. The method of claim 1, wherein the second titanium aluminide has an elongation at break which is at least 20% lower than that of the first titanium aluminide.

7. The method of claim 1, wherein the second titanium aluminide has an elongation at break which is at least 40% lower than that of the first titanium aluminide.

8. The method of claim 1, wherein a transition in a brittle-ductile phase of the second titanium aluminide is at a higher temperature than a corresponding transition of the first titanium aluminide.

9. The method of claim 1, wherein a creep resistance of the second titanium aluminide is higher by at least about 50° C. than that of the first titanium aluminide.

10. The method of claim 9, wherein a creep resistance of the second titanium aluminide is higher by at least about 100° C. than that of the first titanium aluminide.

11. The method of claim 1, wherein a mutual relative movement of the first workpiece and of the second workpiece in the friction welding has a maximum amplitude of at least about 0.1 mm and at most about 5 mm.

12. The method of claim 1, wherein a mutual relative movement of the first workpiece and of the second workpiece in the friction welding is periodic and has a frequency of at least about 25 Hz and at most about 125 Hz.

13. The method of claim 11, wherein a mutual relative movement of the first workpiece and of the second workpiece in the friction welding is periodic and has a frequency f of at least about 25 Hz and at most about 125 Hz.

14. The method of claim 12, wherein the first workpiece and the second workpiece in the friction welding, while the first workpiece and the second workpiece are moved relative to one another, are pressed against one another at a surface pressure of at least about 50 MPa and at most about 250 MPa.

15. The method of claim 13, wherein the first workpiece and the second workpiece in the friction welding, while the first workpiece and the second workpiece are moved relative to one another, are pressed against one another at a surface pressure of at least about 50 MPa and at most about 250 MPa.

16. The method of claim 1, wherein post-compressing for a period of at least about 10 s and at most about 300 s at a surface pressure that is at least as high as a surface pressure during the friction welding takes place subsequently to the friction welding.

17. The method of claim 1, wherein a joint area between the first workpiece and the second workpiece is preheated to a temperature above a brittle-ductile transition of at least one of the two materials.

18. The method of claim 1, wherein the composite component after the friction welding is heat-treated at a temperature of at least about 800° C.

19. The method of claim 1, wherein after the friction welding the blade root is machined from the first region in a material-subtracting further processing.

20. The method of claim 1, wherein after the friction welding the blade airfoil is machined from the second region in a material-subtracting further processing.

* * * * *